United States Patent [19]

Martin et al.

[11] Patent Number: 4,498,157
[45] Date of Patent: Feb. 5, 1985

[54] METHOD OF DETERMINING WEATHERING CORRECTIONS IN SEISMIC OPERATIONS

[75] Inventors: Lincoln A. Martin, Altadena; William F. Fenley, Jr., Pasadena, both of Calif.

[73] Assignee: Geophysical Systems Corporation, Pasadena, Calif.

[21] Appl. No.: 255,379

[22] Filed: Apr. 20, 1981

[51] Int. Cl.³ .............................................. G01V 1/36
[52] U.S. Cl. .......................................... 367/50; 367/53; 367/56
[58] Field of Search ................... 367/40, 41, 50, 53, 367/54, 56; 364/42

[56] References Cited

U.S. PATENT DOCUMENTS

| | | | |
|---|---|---|---|
| 3,681,749 | 8/1972 | Feree et al. | 367/53 |
| 3,731,269 | 5/1973 | Judson et al. | 367/54 |
| 3,794,827 | 2/1974 | Widess | 367/56 |
| 3,940,734 | 2/1976 | Blum | 367/50 |
| 4,069,471 | 1/1978 | Silverman | 367/40 |
| 4,101,867 | 7/1978 | Martin | 367/36 |
| 4,189,704 | 2/1980 | Martin et al. | 367/40 |
| 4,316,268 | 2/1982 | Ostrader | 367/50 |
| 4,346,461 | 8/1982 | Muis | 367/39 |

FOREIGN PATENT DOCUMENTS

| | | | |
|---|---|---|---|
| 989059 | 11/1971 | Canada | 367/56 |
| 908796 | 8/1972 | Canada | 367/53 |

OTHER PUBLICATIONS

Lin et al., "Maximum Likelihood . . . Static Corrections", 2/75, p. 139, Geophysics, vol. 40, #1.

Primary Examiner—Nelson Moskowitz

[57] ABSTRACT

In a seismic recording and processing system in which a line of sources and a separate line of receivers are provided and each of the source operations from each of the source points is recorded on all receiver points. A method is described for determining the differential static correction between each adjacent pair of source points in terms of the differences in travel times from each pair of source points, to all pairs of receiver points. This is provided even though the lines of source points and receiver points may be parallel to or at angles to each other, and the spacings of source points and receiver points in their separate lines may be the same or different.

22 Claims, 11 Drawing Figures

METHOD OF DETERMINING WEATHERING CORRECTIONS IN SEISMIC OPERATIONS

CROSS-REFERENCE TO RELATED PATENT

This application is related to the U.S. Pat. No. 4,101,867 of Lincoln D. Martin issued July 18, 1978, and to U.S. Pat. No. 4,058,791, issued in the names of Lincoln A. Martin and William Fenley, Jr.

DEFINITIONS

Correlation: Identifying a phase of a seismic record as representing the same phase of another record. Indicating that events on two seismic records or traces are reflections from the same stratigraphic sequence or refractions from the same marker.

Cross Correlation Function: A measure of the similarity of two waveforms. A graph of the results of a correlation operation. A correlogram.

First Break: The first recorded signal attributable to seismic wave travel from a known source. First breaks on reflection records are used for information about weathering.

Record: A recording of the energy from one shot or other type of source, picked up by a spread of geophones. A record may be on photographic or other paper, or on magnetic tape. A TRACE is a record of a single geophone channel.

Refraction Wave: A wave which travels obliquely downward from a source in a low velocity formation to a high velocity formation, then within the high velocity formation parallel to the interface, and finally, obliquely upward in the low velocity formation to the detectors.

Weathering: The low velocity layer, a zone of low velocity material near the earth's surface, at the base of which the velocity abruptly increases. The term LVL (lower velocity layer) is also often used. Weathering velocity is typically 1500 to 2500 fps. The subweathering velocity may be 5000 fps or greater.

Weathering Correction: A correction of seismic reflection or refraction times to remove the delay in the LVL.

Time Break: The mark on a seismic record which indicates the shot instant or the time at which the seismic wave from any type source was generated.

Traveltime: The time between the time break and the recording of a seismic event, such as a first break.

Sourcepoint: Position of the source of the seismic wave.

Receiver Point, Geophone Point: Position of the geophone or other receiver or detector of the seismic wave.

BACKGROUND OF THE INVENTION

This invention lies in the field of seismic processing. More particularly, it concerns the determination of weathering or static corrections between records recorded from sources at adjacent source points, or between traces to adjacent geophone points.

While this invention can be used with any type of source it is of greatest value in relation to sources which are initiated at the surface of the earth, such as the Vibroseis, the Dynoseis, the thumper, and others. It will for convenience be described in terms of the vibratory source systems.

In the seismic process of geophysical prospecting, wherein a vibratory source generates an alternating pressure on the surface of the earth at a first source point, it is important to know the time of travel of the seismic wave from the surface through the weathered layer.

More correctly, it is important to know the difference in the times of travel through the weathered layer of the downgoing seismic waves generated by the source at each of two adjacent source points. This is needed to properly interpret travel time differences to reflecting interfaces, so as to determine the slope or the dip of those reflecting interfaces. These differences in time throuh the weathered (or weathering or low velocity layer (LVL) are called the fixed or static corrections.

A. In the case of dynamite shots, the travel time of the seismic wave through the weathering, or the depth to the base of weathering, can often be determined from measurement of the seismic pulse from the deep shot to a surface geophone at the shot point. This is called the uphole time. Of course, this method cannot be used with surface sources.

B. Another qualitative method involves determining static corrections by adjusting travel times so that a strong shallow reflection, which is believed to be flat, will be shown on the record as a true horizontal reflection.

C. Another qualitative method that has been used involves adjusting the travel times of a plurality of travel paths from different source and receiver points to the same common reflection point.

Vibratory seismic systems and other systems that use seismic sources at the surface of the earth, are limited in their capability to determine static corrections, because there are no drilled holes, and no subsurface sources.

The method of determination as described in B and C above are not reliable, since basing the corrections on deep reflection information involves many variables, few of which are known. It is clear, therefore, that there is no reliable method in use today for determining the static corrections.

SUMMARY OF THE INVENTION

It is a primary object of this invention to provide a method of determining the differential static correction between adjacent source points by timing corresponding traces of two records taken from adjacent source points to all receiver points.

It is a further object of this invention to determine the time differences between two corresponding traces (having approximately the same source-to-detector distances) by correlating portions of those traces, one against the other, repeating the correlations for other corresponding pairs of traces, and determining the average travel time difference for all pairs.

It is a still further object to determine the travel time difference between pairs of paths from two adjacent source points to all possible pairs of adjacent receiver points, where the horizontal dimensions of the pairs of paths are not precisely equal.

It is a still further object to determine these time differences when the lines of source points and receiver points are not the same, but can be curved lines or displaced parallel lines or intersecting lines, and the spacings of sources and receivers in their lines may not be the same.

These and other objects and advantages of this invention are realized and the limitations of the prior art are overcome in this invention by recording two multiple trace records taken from adjacent source points (SPs) to all receiver points (RPs). The first refraction portions of each trace from the first break to a selected time value past the first break are isolated. These refraction portions of the traces are taken from each of the two adjacent SPs to each pair of adjacent RPs.

Knowing the positions of each of the RPs and SPs, the horizontal lengths of the individual paths in each pair of paths is determined. If the differential length of path in each pair is greater than a selected small distance, these pairs are discarded. If the differential length of the two paths is less than this small distance, a differential small-time correction dt is calculated, in terms of known subweathering velocity.

The selected short portions of the non-discarded traces having approximately equal paths are correlated, and the lead and lag of one trace with respect to the other are determined. Any time differential dt calculated on the basis of different path lengths is then applied. The corrected leads or lags are algebraically added for all useful pairs of traces, and the average lead or lag is determined. This average value is the lead or lag of the travel time through the weathered layer at the two SPs, which is the relative static correction of one record with respect to the other record.

This method provides a precise value for the difference in travel time to the base of weathering at each pair of SPs. The precision of measurement is increased with increase in the number of pairs of traces correlated, and with decrease in the spacing between adjacent source points.

Consequently, the precision is greatest in records taken with surface sources, where a great number of separate channels are recorded and, where a source is positioned at each detector position. Such a system is fully described in U.S. Pat. No. 4,101,867, to which reference has been made.

BRIEF DESCRIPTION OF THE DRAWINGS

These and other objects and advantages of the invention and a better understanding of the principles and details of the invention will be evident from the following description taken in conjunction with the appended drawings, in which.

DESCRIPTION OF THE PREFERRED EMBODIMENT

Figure 1:
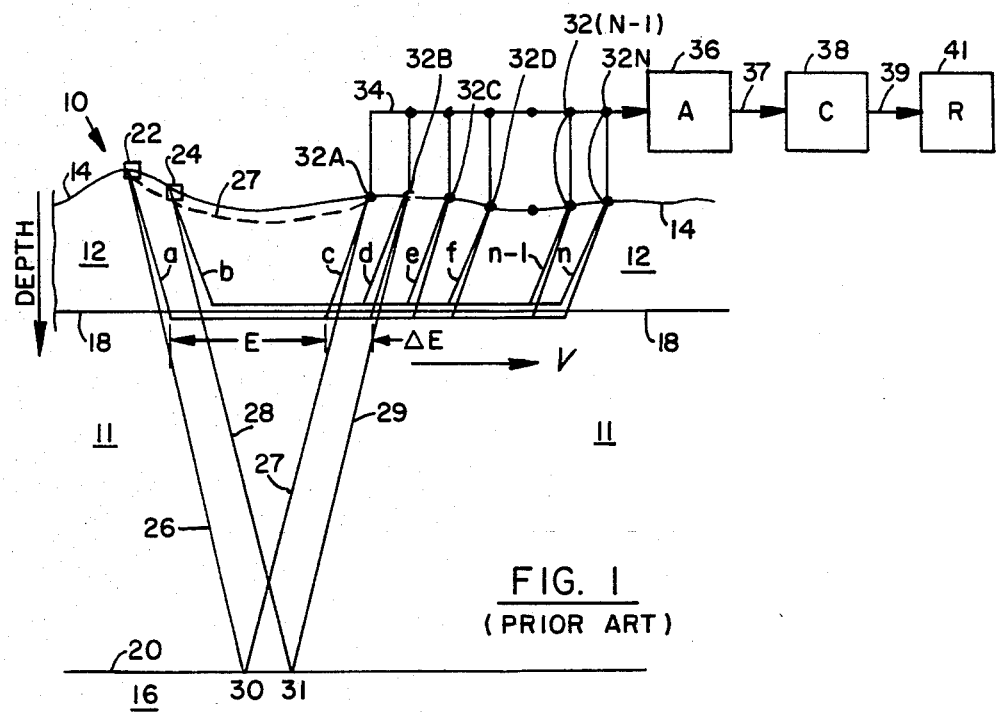
FIG. 1 is a duplicate of FIG. 1 of 4,101,867.

Refer now to the drawing, and in particular to FIG. 1 which is the same as FIG. 1 of U.S. Pat. No. 4,101,867. There is shown a cross-section of a portion of the earth 10, having a surface contour 14, a weathered layer 12, an interface plane 18 between the weathered layer 12 and the subweathered layer 11. At some greater depth there is another reflecting interface (or plane) 20 between two geologic formations 11 and 16.

There are two source positions 22,24 on the surface 14. These can be vibratory sources or impulsive sources. If they are vibratory sources the records must be correlated with the sweep to get correlated traces or correlograms, which are then processed.

A plurality of geophones 32A, 32B, 32C . . . 32(N−1), 32N are positioned on the surface, along the linear survey line 14 through which the vertical cross-section is taken. The spacing along the surface of the source points 22, 24 and the geophone positions is constant and equal to $\Delta E$. Preferably, the sources are located at geophone positions.

When a source is at position 22 and energized, the seismic wave will progress by path a,E,c to geophone 32A. That is, the energy goes substantially vertically downward, a, to the base of weathering interface 18. The velocity of propagation of the seismic (elastic) wave in the weathered layer 12 is quite low, of the order of 1500 to 2500 fps. The velocity of propagation in the subweathered layer 11 (just below the interface 18) may be 5000 to 6000 fps. So energy that goes down to the interface 18 and is refracted, E, horizontally in 11, then up, c, to 32A, will be the first signal (first break or first arrival) to reach the geophone 32A. It will arrive before the energy through the direct path 27 arrives, because of the low velocity in 12.

This path is important since it includes the leg a, which because of the unknown low velocity in 12 represents a sizeable time interval. If the thickness of the weathered layer is known imperfectly, and its velocity is known imperfectly, there can be a large time error in determining the vertical travel time through the weathered layer.

Drawn in FIG. 1 are ray paths 26,28 from source positions 22,24 to a deep reflecting horizon 20, where the rays are reflected at 30,31 and returned to the surface by rays 27,29 to geophones 32A, 32B, etc. It will be clear that the path a, through the weathered layer 12, forms a part of the paths 26,27 to the geophones. Thus, error in determination of the travel time through the leg a can cause a large error in estimation of the depth of the interface 20.

While it is desirable to know the absolute travel times a and b, it is impossible to get that information without drilling a hole to the interface 18 and actually measuring the travel time.

While the absolute depth of the reflecting interface 20 is desirable, the most important parameter is the dip or slope of the interface 20. This can be found by taking the difference in the travel times over the adjacent legs a and b, since by repeating the process between successive pairs of source points, the weathering time difference between any two source points can be determined. The problem then resolves itself into finding the travel time differences over paths a and b.

Figure 2:
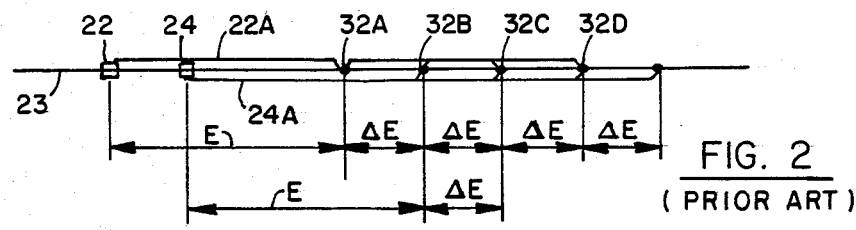
FIG. 2 is a plan view of FIG. 1.
Figure 3:
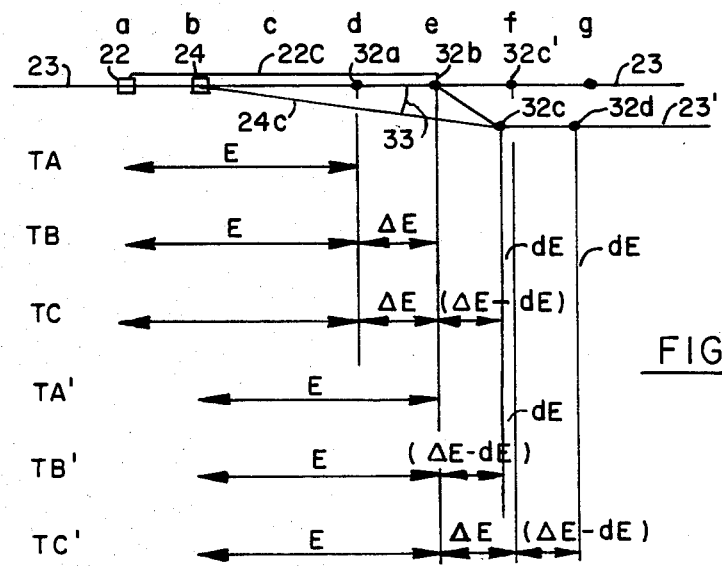
FIG. 3 illustrates a plan view of a curved line of profile.

Refer now to FIGS. 2 and 3 of U.S. Pat. No. 4,101,867. These are parts of two records taken with the source successively at points 22 and 24, respectively. The vertical line $T_0$ represents the time break, or time at which the source acted. The traces labelled 32A, 32B . . . 32N represent the corresponding traces which represent the seismic energy received at the corresponding geophones. The signals from the geophones go by leads 34 to a multi-channel amplifier assembly 36, and then by leads 37 to a correlator 38, where the traces are correlated aginst a sweep signal, and then by leads 39 to a recorder 41. The correlation step need not be done "on line", but all of these steps are well known in the industry and need not be described further.

The early parts (or the refraction portions) of the traces of a record recorded with source 22 would be as shown in FIG. 2, and with source 24, as shown in FIG. 3. Because the succeeding geophone positions 32A, 32B, 32C etc. are farther from the source, the first signals arrive at later times after $T_0$.

Consider the start of the traces 40A, 40B, 40C, etc. for example, marked by times $T_A$, $T_B$, $T_C$, etc. By using a high amplifier gain, it is sometimes possible to spread out and make clear traces so it is possible by eye to make a rather precise estimate of $T_A$, $T_B$, etc. by observing the specific time instant that the trace "breaks" from the quiet line prior to the arrival of energy.

Figure 8:
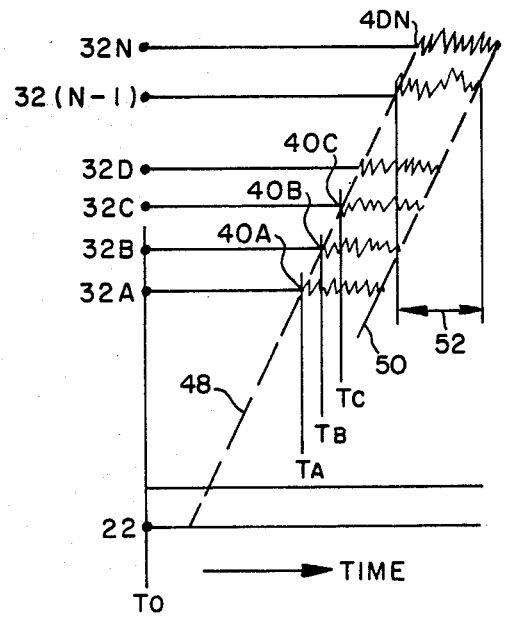
FIG. 8 is identical to FIG. 2 of U.S. Pat. No. 4,101,867.

Returning to FIGS. 1 and 8, it will be clear that $T_A$ is the travel time through paths a,E,c, or:

$$T_A = a + E + c$$

$$T_B = a + E + \Delta E + d$$

$$T_C = a + E + 2\Delta E + e, \text{ and so on} \quad (1)$$

Also, from source point 24 and the second record figure $$T_A' = b + E + d$$

$$T_B' = b + E + \Delta E + e$$

$$T_C' = b + E + 2\Delta E + f \text{ and so on} \quad (2)$$

It was shown that the quantity of interest is the time difference through paths a and b, or simply $(a-b)$. Thus, the Correction (or Weathering Correction) (22−24) equals $(a-b)$. Thus:

$$\begin{aligned} T_A - T_{A'} &= (a + c) - (b + d) \\ &= [a - b + c - d] \\ T_B - T_{B'} &= [a - b + d - e] \\ T_C - T_{C'} &= [a - b + e - f] \end{aligned} \quad (3)$$

and so on, leaving out the E's since they clearly cancel out.

Now, take the sum of these N time differences, and divide the sum by N, to get the average.

$$\text{Corr. } (22-24) = 1/N [N(a-b)+(c-f)],$$

or for N traces.

$$\begin{aligned} \text{Corr. } (22-24) &= 1/N [N(a - b) + c - n] \\ &= (a - b) + (c - n)/N \end{aligned} \quad (4)$$

Since c and n are approximately equal and are divided by a large number N, the weathering correction required is:

$$\text{Corr. } (22-24) = (a - b) \quad (5)$$

-continued
$$= [(T_A - T_{A'}) + (T_B - T_{B'}) \ldots]$$

Figure 5A:
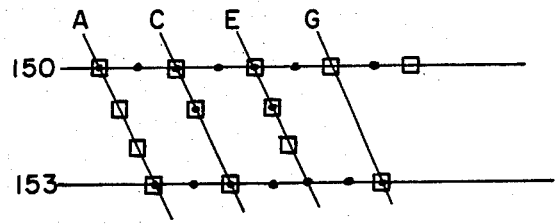
FIG. 5A illustrates a variation of FIG. 5 where the source lines and receiver lines are not at right angles.
Figure 4:
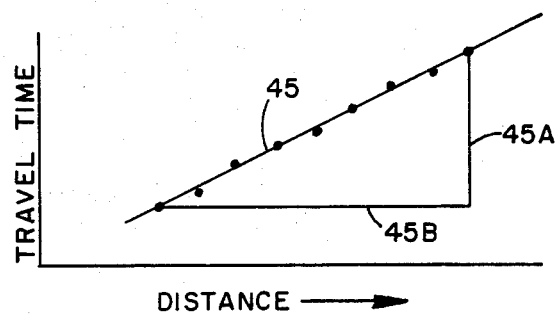
FIG. 4 illustrates the method of determining the horizontal velocity of seismic waves in the subweathering formation in the earth.
Figure 5:
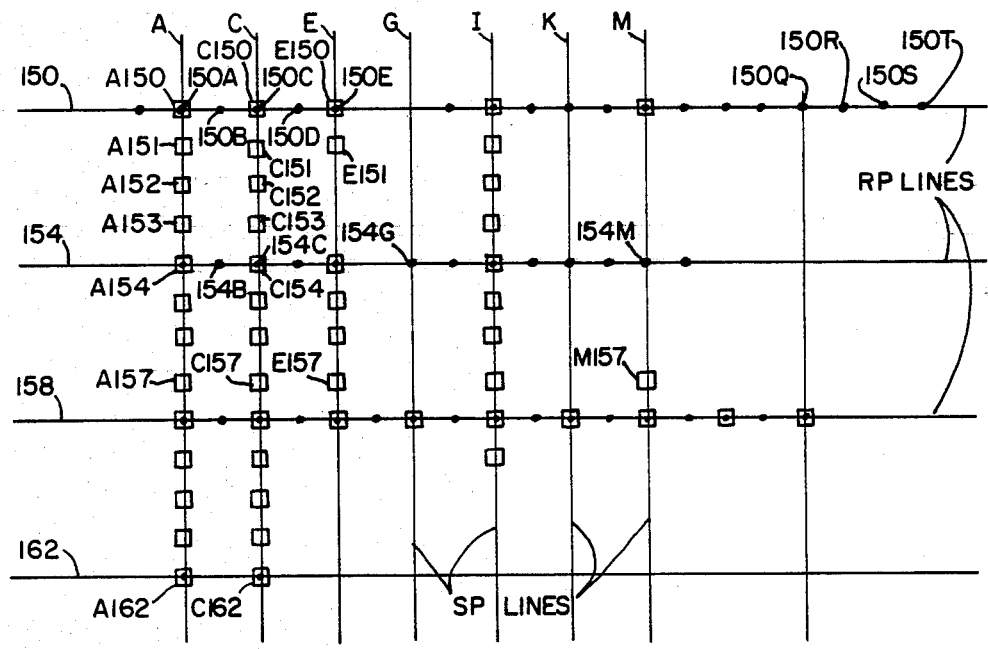
FIG. 5 illustrates one embodiment of a two-dimensional surface spread of sources and receivers.

If the records are such, as in FIGS. 4 and 5, that the times $T_A$, $T_A'$, $T_B$, $T_B'$, etc. can be read by eye and compared, or, if the two traces 32A and 32B' can be recorded side-by-side and a judgment made of the displacement of points 40A, 40B, etc., the differences can be estimated. This would be called "correlation by eye", and this type of correlation by eye (to time reflection events on traces) has been done extensively in the past.

There is a more precise way of determining the differences in timing 40A, 40B, etc., and that is by mathematically correlating the traces 32A and 32B' against each other.

Reference is made to U.S. Pat. No. 2,889,000 issued June 2, 1959 in the name of Silverman et al, entitled: Seismic Surveying. In this patent it is taught how to correlate two separate traces from the same record from the same source but for different geophone distances from the source. This is referred to for the purpose of illustrating apparatus that can be used for making trace correlations. Other apparatus for making correlations between two seismic trace wave forms is also well known in the industry, and need not be further discussed, particularly since this apparatus forms no part of this invention.

It is clear that this U.S. Pat. No. 2,889,000 does not anticipate this invention because claims (claim 1) specifically call for correlating two traces taken at different distances from the source on the same record, while this invention calls for correlating two traces from different sources and for the same source geophone distance.

It is possible to describe the method of this invention as:

At two adjacent source locations sequentially recording a plurality of traces at a plurality of geophones spaced from the source, selecting two geophone signals from geophones spaced from the source in successive records by equal distances, slowly varying the time phase between the two signals (traces), repeatedly multiplying together the signals received at these geophones, to produce product functions, repeatedly forming the integral of these product functions for separate different values of time phase, and recording the values of these integrals in relation to the different values of the varying time phase. This is the classical mathematical process of correlation.

In this method, the steps to determine $T_A - T_A'$ etc. will be done by correlation. This will include the classical process just described, or the optical correlation between selected traces to measure a time difference, or the separate measurement of times $T_A$, $T_B$, $T_B'$, $T_C'$, etc. and the determination of time differences.

To perform the classical correlation on traces 40A, 42A, 40B, 42B, etc., it is necessary to isolate pairs of traces 32A from source 22 and 32B' from source 24, and so on. The entire trace can be used, or only the part of it. Since the part of real value is the first part of the trace, where the principal energy comes by the refraction of energy at the base of weathering, it is preferable to isolate the first part of the trace, say for 100 milliseconds, or perhaps 150, or 250 ms, with the remainder of the trace muted.

Selecting appropriate pairs of short traces for equally distant traces, on adjacent records, as shown in equation 5, and summing the times for N pairs of traces, and dividing the sum by N, will provide a precise value of difference in static correction for adjacent source points. By choosing the next pair of adjacent source points and records, a second differential value is found, and so on. Thus it is possible to determine the difference in static correction for widely spaced source points by this process using successive closely spaced pairs of source points.

It will be clear that the larger the number of traces N, the larger the number of pairs of traces, and the better averaging of the correlograms of pairs of traces, to the end that the effects of noise on the traces are minimized, and as precise a value of weathering correction as desired can be determined. Also, the closer the position of the two source points, the more precise the value of correction.

In the ultimate case, the preferred system provides a great number of separate traces, say up to 512, with a source point at each geophone position. While this involves handling on a computer a great number of traces, it only requires a short length of trace. Furthermore, as has been shown in application Ser. No. 617,859, by recording each trace to only 1 bit, and by compositing a great many traces, it is possible to store and handle many traces at great speed, to provide a precise determination of fixed corrections.

What has been described so far is substantially all prior art, based on U.S. Pat. No. 4,101,867, which is provided as introduction to the novel features of this invention.

RUNNING AVERAGE

The following equations (1), (2), (3), (4), and (5) of U.S. Pat. No. 4,101,867 show the final result:

$$\text{Static Correction} + W = a - b = 1/N \quad [(TA - TA') + (TB - TB') + \ldots] \tag{5}$$

This procedure is based on certain assumptions, as follows:
(a) colinear arrays of SPs and RPs;
(b) equal spacings between SPs and RPs, resulting in equal lengths of paths for pairs of traces;
(c) a plane horizontal interface 18 between the weathering zone (12) and the subweathering formation (11); and
(d) a constant horizontal velocity V in the subweathering formation.

While it is easy to determine whether assumptions (a) and (b) are valid, there is no way of determining the validity of (c) and (d).

We have found that in following the procedures outlined in equations (1), (2), (3), (4), and (5), that very often as the number N of stations, or pairs of traces, increases there is a drift of the average value $(a-b)$, which may be positive or negative. This indicates that the assumptions (c) and (d) are not completely valid over long distances.

We have found, therefore, by taking a running average of $(a-b)$ over a limited number of pairs of traces, that the drift does not occur. The length of the window or the number N of trace pairs clearly is not a precise quantity, since it depends on the geology of the subsurface in the vicinity of the line of profile.

The process would involve the following steps:

Let $TA - TA' = \bar{A}$ $TB - TB' = \bar{B}$, and so on

Then, taking N as 5, for example, as a convenient small number to illustrate the process, and not by way of limitation, the weathering time difference or static correction W, between VP1 and VP2 would be $$W_{1-2} = (\bar{A} + \bar{B} + \bar{C} + \bar{D} + \bar{E})/5$$

$$W_{2-3} = (\bar{B} + \bar{C} + \bar{D} + \bar{E} + \bar{F})/5$$

$$W_{3-4} = (\bar{C} + \bar{D} + \bar{E} + \bar{F} + \bar{G})/5, \text{ and so on}$$

Since with modern seismic instrumentation, with 1024 traces and with geophones spaced 50-100 feet apart, length of recording spreads can reach 10-15 miles or more. It is too much to expect that the assumption of (c) and (d) above could hold precisely over these great distances. As a practical value for N, it would be reasonable to use values of $N = 10$ to 50, or even more, as the window over which the running averages are taken.

Averaging over a great number of receiver positions (RPs) may not be valid since the assumptions (c) and (d) may not be valid over the long dimensions of the geophone spread. On the other hand, the validity of the process of Equation 5 is not affected by the length of the spread. The reason for this is that in view of assumptions (a) and (b) the two subweathering paths of the seismic refracted waves, from source 22 to RP $(32(N-1))$ and from source 24 to RP(32N) are equal, despite the large length $(E + N\Delta E)$ along the line, and because the two paths are coincident except for the small portions $\Delta E$ at each end. And, of course, if there is a variation in geology, both paths are equally affected.

It is necessary, therefore, to add another assumption (e) which is really inherent in assumption (2), namely:
(e) the subweathering refraction paths from the pair of VPs to a selected pair of RPs must be substantially coincident.

This assumption (e) is illustrated by FIG. 2 which is a plan view of FIG. 1. The lines 22A and 24A represent the path of the seismic waves from the VPs 22,24 to the RPs 32A, 32B respectively. While they are drawn parallel and spaced from the line 23 which is the line of profile, this is only for convenience of illustration. The three lines 22A, 24A and 23 should be superimposed, and are substantially coincident.

CURVED LINE STATICS

Referring now to FIG. 3, there is shown a variation of FIG. 2 in which the line of profile is a curved line. While the spacings 32B-32C and 32B-32C' might both be equal, and equal to $\Delta E$, the length of path 24C is not equal to path 22C. It is shorter due to the position of 32C' which is laterally displaced from the line 23. The angle 33 between 24C and 22C indicates that the paths from 22 and 24 to 32B and 32C are not precisely coincident. Thus assumption (a), (b) and (e) may not be entirely valid.

Of course, if the paths 22A and 24A are long—say 10,000 feet, and the spacing $\Delta E$ is 100 feet, then the angle 33 would be so small that it could be said that the two paths are substantially coincident, and thus assumption (e) is valid.

However, the total travel paths 22C and 24C are not equal and the difference in travel times for the horizontal parts of the path must be determined. As shown in FIG. 3 and FIG. 1 and in equations (1) and (2);

$$TA = a + E + C$$

$$TB = a + E + \Delta E + d$$

$$TC = a + E + \Delta E + (\Delta E - dE) + e \qquad (6)$$

and $$TA' = b + E + d$$

$$TB' = b + E + (\Delta E - dE) + e$$

$$TC' = b + E + \Delta E + (\Delta E - dE) + f$$

Total path 24C is shorter than path 22C by a differential length (dE), and the time of travel of the seismic waves over short path (dE) is=dE/V where V is the refraction velocity in the subweathering formation 11.

The value of V, the subweathering velocity, can be determined by plotting the values of total travel time as ordinates (FIG. 4) against distances as abscissa, for each of the separate paths from say source 22 to a large number of RPs. Even though the spacings ΔE may all be equal, the plotted points may not fall on a straight line 45. The reason is that the plotted times include travel through the weathering zone. We are not interested in specific travel times, but only in the slope of the line 45, which is the least square fit to the plotted points. The slope is represented by the ratio of 45B/45A which is the ratio of incremental distance 45B divided by the incremental time 45A to travel that distance 45B. The ratio 45B/45A is the horizontal velocity of seismic waves in the subweathered layer 11.

In laying out the spreads showing SPs and RPs, the precise positions of each SP and RP are determined in X and Y coordinates. So it becomes a simple matter for the computer to determine each horizontal distance from a given SP to each of the RPs, and thus the value of differential distance can be determined very easily.

The travel time of the seismic wave over a distance dE is equal to dE/V, which provides the time (dt) which is to be added to or subtracted from path 24C to make it correspond (in horizontal distance) to path 22C, for example.

It might be said that the determination of velocity V is imprecise, and that the determination of travel time through (dE) is therefore not precise. However, we have found that the correction is such a small part of the total travel time that lack of precision in determination is not important. We have arbitrarily set a maximum value of correction time through (dE) at of the order of 10 milliseconds (ms). If the time correction due to (dE) is greater than this number of ms, that particular pair of refraction paths is not used in the computation of the average static correction. Of course, the number 10 ms. is shown as an example, and each user can select his own value, which may be less, or greater, than 10 milliseconds.

Whenever the line of profile operates along a trail or path, the curvature of the line can be much more complex than that shown in FIG. 3, but the computations are handled in the same manner, based on equations (6).

Figure 3A:
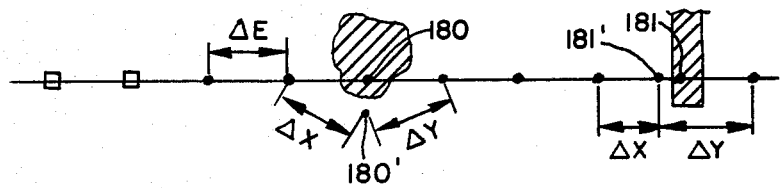
FIG. 3A illustrates a special case of FIG. 3.

Also, when in laying out the line of profile a large obstruction such as a boulder, wall, or building prevents the making of spacings between SPs and/or RPs equal, the process is carried out by the means illustrated in FIG. 3. Two cases are illustrated in FIG. 3A, where the RP 180 is displaced laterally from the line 23 to 180' or longitudinally in the line 23 from 181 to 181'. It is clear that X and Y are not equal to E.

THREE DIMENSIONAL SPREADS

With seismic instrumentation that provides a very large number of separate recording channels, it becomes economic to operate with three-dimensional seismic recording and processing. This utilizes a two-dimensional array of geophones and sources, such as are illustrated in FIG. 5 by way of example, but not by way of limitation. The geophones are generally laid out, with preferably equal spacing between RPs, shown as small circles 150A, 150B, 150C, ... 150S, 150T, and so on.

There are generally a plurality of parallel lines of RPs, such as lines 150, 154, 158, 162, and so on. After all the geophones are laid out, the source, such as a vibrator unit, is run along source lines such as A, C, E, G, ... M., and so on, which are generally run perpendicular to the RP lines. The spacing of the source lines is preferably related to the RP spacing along the lines. That is, the spacing between source lines may be, for example, say twice, or some other factor times the RP spacing (as illustrated in FIG. 5). The SP spacing along the source lines is a simple fraction of the spacing between the RP lines, such as ¼, for example, as shown in FIG. 5. Wherever SP lines cross RP lines, the VPs and RPs are generally at the same points, although this is not a requirement.

In the use of great numbers of RPs and SPs, it is desirable to handle the calculations and processing by means of a computer. In other words, the processing is done very methodically. As was taught in U.S. Pat. No. 4,101,867, a line of SPs is chosen and two adjacent SPs, such as A150 and A151. Pairs of paths between these two SPs and each adjacent pair of RPs are chosen, and the lengths of each of these pairs of paths are determined.

A value of V, the subweathering velocity, is determined, and the largest differential path ΔE', based on the chosen number 10 ms. and the known V is determined. Any pair of paths that are equal in length, of course, is useable. Other path pairs for which dE is less than ΔE' will be used with appropriate time correction, dt. Those path pairs for which dE is greater than ΔE' will be discarded and the processing of the data can proceed.

When all useful path pairs have been utilized and the value of N determined, the next adjacent pairs of paths are determined and processed to get a second value of W. This process is continued until all of the SPs on the first source line A are completed. Then the next source line C is processed in the same way. The process is then continued until all source pairs on all source lines have been handled.

Later, if it is desired to tie SPs on source line A to the corresponding SPs on source line C or with any other line, that can be done along the linear arrays of SPs and RPs along lines 150, 154, etc. as taught in U.S. Pat. No. 4,101,867. However, it is not believed that such ties are necessary since each pair of sources is considered in relation to all receivers, etc.

In U.S. Pat. No. 4,101,867 it was shown how the weathering difference between two adjacent RPs is determined in terms of path pairs to each of the SPs. The same processing of the data used for determining the weathering difference between two adjacent SPs can be used for determining the weathering differences between two adjacent RPs.

While FIG. 5 was drawn with source lines and receiver lines at right angles to each other, which is the preferred arrangement, it is clearly possible to have these two sets of lines at angles of less than 90°. Also, while we show the VP and RPs at the same positions where the two sets of lines cross each other, this is only for convenience, and not by way of limitiaton.

FIG. 5A shows a variation of FIG. 5, where the two sets of lines cross each other at angles of less than 90°. So long as the precise position of each SP and of each RP is known, the spacings between them can be calculated. However, we have found that for the case of perpendicular lines and coincident positions of VPs and RPs, there are a much larger number of path pairs that can be used in determining the static corrections.

FIG. 5 shows a very general case and provides a very busy diagram. FIG. 6 has been drawn to show an enlarged view of part of FIG. 5 so that can be illustrated the variety of trace pairs that can be formed from a single pair of SPs to a plurality of RPs.

The principal type of interaction is between a pair of SPs on a source line A to a plurality of RPs on a plurality of spaced parallel cross receiver lines such as 150, 154, 158, etc. The static correction W between sources A150 and A151 can be determined in terms of differences in travel times along the pairs of paths between SPA150 and RP 150I, shown as X4, and between SPA151 to RP 150H shown as X3.

The times are measured between two laterally spaced SPs and successive pairs of RPs along RP line 150. Generally, these pairs of paths will have intersecting subsurface paths. Of course, the correction dt for the small differential differential distances dE in path length must be handled in accordance with FIG. 3. If, for example, dt is chosen at 10 ms. or 0.01 sec. and V is say 5000 ft./sec., dE will be 50 ft., which would be the maximum permitted differential length of the two paths in each pair.

It will be clear that the greater the lengths of the paths, or the distances from SPs to RPs, and the smaller the lateral spacings between SPs, the more nearly the criteria previously discussed would apply.

Figure 6A:
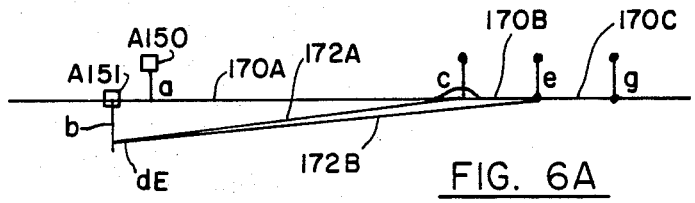
FIG. 6A illustrates a portion of FIG. 6.
Figure 6:
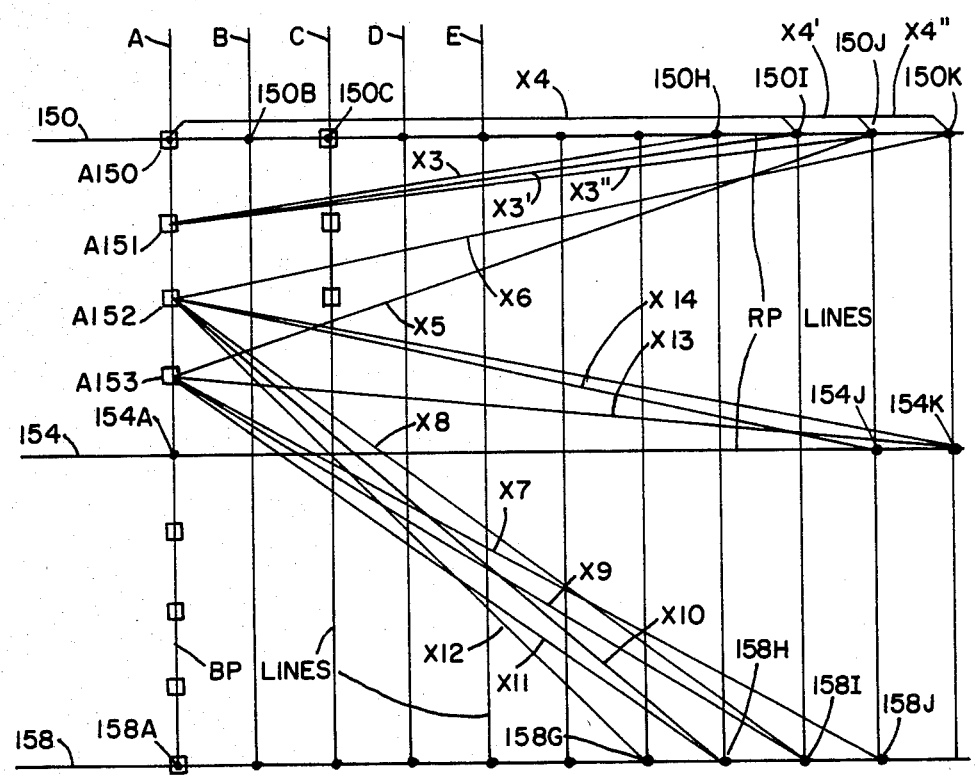
FIG. 6 is an enlargement of part of FIG. 5, and illustrates several typical path pairs between a line of source points and a plurality of perpendicular lines of receiver points.

Thus, in FIG. 6A, the travel time TA from A150 to 150I as determined from the seismic traces, would be in accordance with equations 1, 2, 3, $$TA1 = a + (170A + 170B)/V + e$$

$$TB1 = b + (172A \pm dE)/V + c \quad (7)$$

where
 a is the time for vertical travel down at A150,
 b is the time for vertical travel down at A151
 c is the time for vertical travel up at A150H, and
 e is the time for vertical travel up at A150I.

Then one value of static correction is simply (TA1−TB1) as measured from the traces. Similarly, $$TA2 = a + (170A + 170B + 170C)1V + g$$

$$TB2 = b + (172B)/V + e, \text{ and}$$

(TA1−TB1), (TA2−TB2), TA3−TB3, and so on for the same SPs to successive single RPs along the line can be determined.

Static Correction = $W = 1/N(a_i - b_i)$
 $= 1/N[(TA1 - TB1) + (TA2 - TB2)$
 $+ \ldots + (TAN - TBN)]$ Thus, with intersecting subsurface paths, by marking symmetrical geometry, or by correcting for different lengths of horizontal path, the static correction is simply the difference in refraction times from two SPs at equal distances from selected pair of RPs. Of course, this holds so long as the two subsurface paths are substatially coincident.

Also shown in FIG. 6 are a number of pairs of paths from the adjacent pair of SPs, A152 and A153 to pairs of RPs along RP lines 150, 154, 158, etc. These pairs are labelled X5,X6; X7,X8; X9,X10; X11,X12; X13,X14. These will be understood from the above description. In this manner each pair of SPs are connected in turn to all possible pairs of RPs, their dimensions and differential lengths determined, and each pair is either discarded or time-corrected, and so on.

Figure 7:
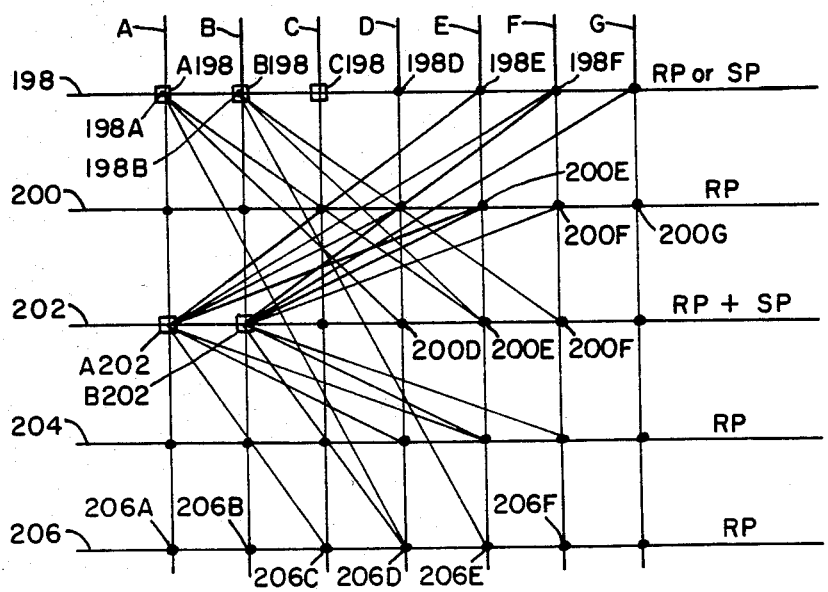
FIG. 7 illustrates another embodiment of a two-dimensional array.

In FIG. 7 is illustrated another simpler two-dimensional array of SPs and RPs. It comprises a plurality of spaced parallel lines of RPs, 200, 204, etc., and at least one line of SPs parallel to and spaced from the lines of RPs.

For convenience the spacings between RPs in each line of RPs would be the same, and preferably equal to the spacings of SPs in the line of SPs. The requirement of precise equality of spacing is not necessary, since small variations in spacings could be taken care of by the dt corrections described in connection with FIG. 6. Also the lines need not be precisely linear since by knowing the coordinates of each SP and RP, the useful pairs of paths can be selected and the others discarded as was discussed in connection with FIG. 3. Also, while path pairs only two lines of RPs and one line of SPs have been indicated, it will be clear that additional lines of RPs such as 198 and 202 shown by dashed lines can be provided at any selected spacing. Also, multiple lines of SPs can be laid out parallel to the lines 200, 202, 204 for a plurality of RPs or a line of SPs can be used between each pair of RP lines.

The method of processing the sensor signals from all of the RPs (taken in pairs) in relation to a selected single pair of SPs, would be identical to that described in FIG. 6.

In FIG. 7 are shown a plurality of pairs of paths from sources A202 and B202 respectively to RPs 200C, 200D, 200E . . . 200I. Also are shown a similar series to the RPs in line 204, and so on. The more geophones or sensors that can be simultaneously recorded, the more data can be obtained from each operation of the source at each SP.

SUMMARY

In review, what has beeen described are:
 (a) the method of handling SP and RP arrays, in which they are both impressed on a line of profile, but in which the line need not be straight, but can be curved, and in which the SP spacings and RP spacings need not be precisely equal, to determine the static correction between two adjacent SPs in terms of a plurality of RPs, and also to determine the static correction between two adjacent RPs in terms of a plurality of SPs.
 (b) the method of determining the static correction by averaging the differential times of each pair of paths from a single pair of SPs to a plurality of RPs (and vice versa) by a running average of the differential times, using a selected number of path pairs in each average.

(c) the method of handling two-dimensional arrays of SPs and RPs, in which parallel spaced lines of RPs are crossed by parallel spaced lines of SPs. The crossings are preferably perpendicular, but can be at other than 90°. Also, while the spacings of RPs along the lines are preferably equal, they need not be equal, so long as their positions are precisely known.

(d) the method of handling two-dimensional arrays of SPs and RPs, in which a plurality of parallel spaced lines of RPs are used, with one or more lines of SPs arrayed parallel to and spaced from the lines of RPs.

While we have not described in detail the method of determining the differential travel time between two selected traces, there are a number of ways of doing this, including the process of correlating one trace against the other. These methods are fully described in the referenced U.S. Pat. No. 4,101,867 and are all well known in the art and need not be described further. When we mention the step of determining the differential travel time between two traces, we include all of the commonly known methods of doing so.

While we have described in detail the process of determining the static correction between a selected pair of SPs in terms of travel times to a plurality of pairs of RPs, we mean to include also the reciprocal process of determining the static correction W between a selected single pair of RPs in terms of the travel times to a selected plurality of pairs of VPs.

We have not described a specific type of seismic source, but just identified as a "source". However, the method is most useful when the source is a so-called surface source, such as a vibrator, dynoseis, thumper, and others well known in the art.

Also, while we have described the various embodiments in which the spacings between SPs are equal, they need not be equal, although it is preferable that the SPs should be an integer multiple of the RP spacing, and so on.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In a seismic system having at least one line of spacial source points (SPs) A,B,C, the position of each SP known; and having at least one different line of spaced receiver points (RPs), D,E,F,G, the positions of each RP known; to the lines not colinear.

the method of determining the differential static time correction by transmission through the weathered layer, from the records from adjacent closely spaced SPs A and B, comprising the steps of;

(a) recording a first record from a first SP, A to a plurality of closely spaced RPs D,E,F,G;

(b) recording a second record from a second SP, B to a plurality of closely spaced RPs D,E,F,G;

(c) determining the horizontal distances from SP A to each of the RPs D,E,F,G,; and from SP B to each of the RPs D,E,F,G,;

(d) selecting a first pair of traces from said first and second records, in which the path lengths from adjacent SPs such as A,B, to a selected pair of RPs such as D,E, differ in length by no more than a selected small dimension dE, for which the differential travel time in the subsurface dt, would be equal to dE/V, where V is the horizontal subweathering velocity;

(e) determining the differential travel time between the two paths from A and B to D and E, applying the time correction dt algebraically to compensate for different lengths of paths, and determining the first timing difference T1 in travel times through the weathered layer at source points A and B and RPs D and E;

(f) repeating steps (d) and (e) for a second pair of traces from the same pair of SPs A and B to a second pair of RPs, such as E and F, adjacent to said first pair; applying the proper time correction dt and determining the second time difference T2 in travel times through the weathered layer; and (g) determining the average value TA of the time differences T1 and T2 of said plurality of pairs of paths.

2. The method as in claim 1 including the additional steps of repeating steps (d)(e)(f) and (g) for all pairs of traces from SPs A and B and determining the average value TA of all of said plurality of time differences.

3. The method as in claim 1 in which said first step of determining the differential travel time between the two paths comprises correlating selected equal initial short portions of said first and second traces, whereby only refracted seismic waves at the base of weathering are correlated.

4. The method as in claim 3 in which said selected portions of said traces include the portion from the first breaks to a selected time interval after said first breaks.

5. The method as in claim 4 in which said selected time interval is less than 100 milliseconds.

6. The method as in claim 4 in which said selected time interval is less than 250 ms.

7. The method as in claim 1 in which at least one of said lines of RPs and SPs is curved.

8. The method as in claim 1 including at least one line of RPs and at least one parallel line of SPs spaced from said line of RPs.

9. The method as in claim 8 including at least two parallel spaced lines of RPs and at least one parallel line of SPs spaced from said lines of RPs.

10. The method as in claim 9 in which said line of SPs is in the space between said at least two lines of RPs.

11. The method as in claim 9 in which said line of SPs is outside of the space between said at least two lines of RPs.

12. The method as in claim 9 including also an additional plurality of spaced RPs alongside of said line of SPs, and spaced therefrom.

13. The method as in claim 1 including at least one line of RPs and one line of SPs in angular relation such that said two lines intersect each other.

14. The method as in claim 1 including at least two parallel lines of SPs and at least two parallel lines of RPs, said at least two pairs of lines crossing each other at a selected angle.

15. The method as in claim 1 in which the source is impulsive.

16. The method as in claim 1 in which the source is vibratory.

17. The method as in claim 1 in which the source is a surface source.

18. The method as in claim 1 in which the spacings between adjacent RPs in the line of RPs are the same.

19. The method as in claim 1 in which the spacings between the SPs in the line of SPs are the same.

20. The method as in claim 1 in which the spacings between the SPs is the same as the spacings between the RPs.

21. The method as in claim 1 including the step of discarding any pairs of paths for which the differential distance is greater than the selected value dE.

22. In a seismic system having at least one line of spaced source points (SPs) such as A,B,C,D the position of each SP known; and having at least one different line of spaced receiver points (RPs) such as E,F,G, the position of each RP known; the two lines not colinear;

the method of determining the differential static correction by transmission through the weathered layer between two closely spaced RPs such as E,F, from the records taken from a plurality of closely spaced SPs, comprising the steps of:

(a) recording a first record from a first SP A to at least two closely spaced RPs E and F, and a second record from a second SP B to at least E and F, and a third record from a third SP C to at least E and F;

(b) determining the horizontal distances from each RP E and F to each of the plurality of SPs A,B,C,D;

(c) selecting a first pair of traces from said first and second records in which the path lengths from adjacent SPs such as A,B, to a selected pair of RPs such as E,F differ in length by no more than a selected small dimension dE, for which the differential travel time in the subweathering would be equal to dE/V where V is the horizontal subweathering velocity;

(d) determining the differential travel time between the two paths from A,B to E,F; and applying the time correction dt algebraically to compensate for different lengths of paths; and determining the first timing difference T1 in travel times through the weathered layer at receiver points E and F;

(e) repeating steps (c) and (d) for a second pair of traces from said second and third records from said SPs B and C to at lesat RPs E and F, applying the proper time correction dt and determining the second time difference T2 in travel times through the weathered layer; and (f) determining the average value TA of the time differences T1 and T2 of said plurality of pairs of paths.

* * * * *